US012809974B2

(12) United States Patent
Pharr et al.

(10) Patent No.: US 12,809,974 B2
(45) **Date of Patent: *Nov. 24, 2026**

(54) SYSTEM AND METHOD FOR IMPROVING CYBERSECURITY FOR TELECOMMUNICATION DEVICES

(71) Applicant: Capital One Services, LLC, McLean, VA (US)

(72) Inventors: Jeff Pharr, Herndon, VA (US); Son Mays, Ashburn, VA (US); Michael Littlejohn, Gainesville, VA (US)

(73) Assignee: Capital One Services, LLC, McLean, VA (US)

( * ) Notice: Subject to any disclaimer, the term of this patent is extended or adjusted under 35 U.S.C. 154(b) by 30 days.

This patent is subject to a terminal disclaimer.

(21) Appl. No.: 18/974,562

(22) Filed: Dec. 9, 2024

(65) Prior Publication Data

US 2025/0103711 A1 Mar. 27, 2025

Related U.S. Application Data

(63) Continuation of application No. 17/401,802, filed on Aug. 13, 2021, now Pat. No. 12,164,630.

(51) Int. Cl.
*G06F 21/55* (2013.01)
*G06F 11/30* (2006.01)
(Continued)

(52) U.S. Cl.
CPC ........ *G06F 21/554* (2013.01); *G06F 11/3079* (2013.01); *G06F 21/51* (2013.01);
(Continued)

(58) Field of Classification Search
CPC .... G06F 21/554; G06F 11/3079; G06F 21/51; G06F 2221/034; G06F 2221/2151;
(Continued)

(56) References Cited

U.S. PATENT DOCUMENTS 9,195,826 B1 * 11/2015 Fang ........................ G06F 21/56
12,164,630 B2 * 12/2024 Pharr .................... H04W 12/63
(Continued)

*Primary Examiner* — Amir Mehrmanesh
*Assistant Examiner* — Thomas A Gyorfi
(74) *Attorney, Agent, or Firm* — Foley & Lardner LLP

(57) ABSTRACT

Methods and systems are described herein for improvements for cybersecurity of telecommunication devices. For example, cybersecurity for telecommunication devices may be improved by analyzing activity log data of telecommunication devices for a candidate event (e.g., the uploading of malware) and disabling one or more services of a telecommunication device. By doing so, cybersecurity for telecommunication devices may be improved by detecting a possible malware intrusion attempt and disabling one or more services of the telecommunication devices. For example, activity log data of telecommunication devices may be obtained. A candidate event indicating malware may be detected in the activity log data. A number of proximate telecommunication devices satisfying a proximity threshold condition may be determined. The number of proximate telecommunication devices that satisfy a density threshold condition may be determined. Responsive to the number of telecommunication devices satisfying a density threshold condition, services of telecommunication devices may be disabled.

20 Claims, 6 Drawing Sheets

(51) Int. Cl.
*G06F 21/51* (2013.01)
*G06N 20/00* (2019.01)
*H04W 4/02* (2018.01)

(52) U.S. Cl.
CPC ....... *G06N 20/00* (2019.01); *G06F 2221/034* (2013.01); *G06F 2221/2151* (2013.01); *H04W 4/023* (2013.01)

(58) Field of Classification Search
CPC ............. G06F 2201/81; G06F 11/3006; G06F 11/3072; G06F 11/3476; G06F 21/552; G06N 3/084; G06N 20/00; H04L 63/14; H04L 2463/121; H04W 4/023; H04W 12/61; H04W 12/63
See application file for complete search history.

(56) References Cited

U.S. PATENT DOCUMENTS

2016/0099963 A1* 4/2016 Mahaffey .............. H04L 63/166
726/25
2018/0288074 A1* 10/2018 Thayer ................ H04L 63/1425
2019/0109821 A1* 4/2019 Clark .................. H04L 63/0414
2019/0392146 A1* 12/2019 Gezalov .................. G06F 21/56

* cited by examiner

SYSTEM AND METHOD FOR IMPROVING CYBERSECURITY FOR TELECOMMUNICATION DEVICES

CROSS-REFERENCE TO RELATED PATENT APPLICATIONS

This application is a continuation of U.S. patent application Ser. No. 17/401,802, filed Aug. 13, 2021. The content of the foregoing application is incorporated herein by reference in its entirety.

BACKGROUND

Telecommunication devices can become infected with harmful software without alerting system managers or users while continuing to operate as normal. If infected, malicious entities may obtain sensitive information regarding users, resources, or other items, from the telecommunication devices. Preventative steps, such as detecting infected telecommunication devices and disabling the infected telecommunication devices can help slow dissemination of sensitive information, however false positives can then render otherwise healthy telecommunication devices non-functional.

SUMMARY OF THE INVENTION

Methods and systems are described herein for improving cybersecurity for telecommunication devices. In particular, cybersecurity for telecommunication devices may be improved by analyzing activity log data of telecommunication devices for a candidate event (e.g., uploading/downloading of malware) and disabling one or more services of a telecommunication device when certain criteria are met. Additionally, when a candidate event is detected, one or more services may be added to a queue for disabling, as opposed to automatically being disabled, until the candidate event may be fully investigated. This can help prevent disabling the telecommunication device even in the case that a false positive was detected.

In some embodiments, activity log data from a plurality of telecommunication devices located at different geographic locations may be obtained. The activity log data may include one or more records of software being loaded on a first telecommunication device of the plurality of telecommunication devices. Based on the software that was loaded on the first telecommunication device, a candidate event indicating malware was loaded on the first telecommunication device may be detected, and a first service of the first telecommunication device may be added to a candidate list of services to be disabled. Additional activity log data from the plurality of telecommunication devices may be analyzed to determine whether the candidate event was detected for any other telecommunication devices of the plurality of telecommunications devices. Based on the additional activity log data, a set of telecommunication devices for which the candidate event was also detected may be identified. A number of proximate telecommunication devices included in the set of telecommunication devices may be determined where each of the proximate telecommunication devices comprise a telecommunication device that satisfies a proximity threshold condition. A determination may then be made as to whether the number of proximate telecommunication devices satisfies a density threshold condition indicative of a malware installation attempt and, responsive to determining that the number of the proximate telecommunication devices satisfy the density threshold condition, the first service of the first telecommunication device may be disabled.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
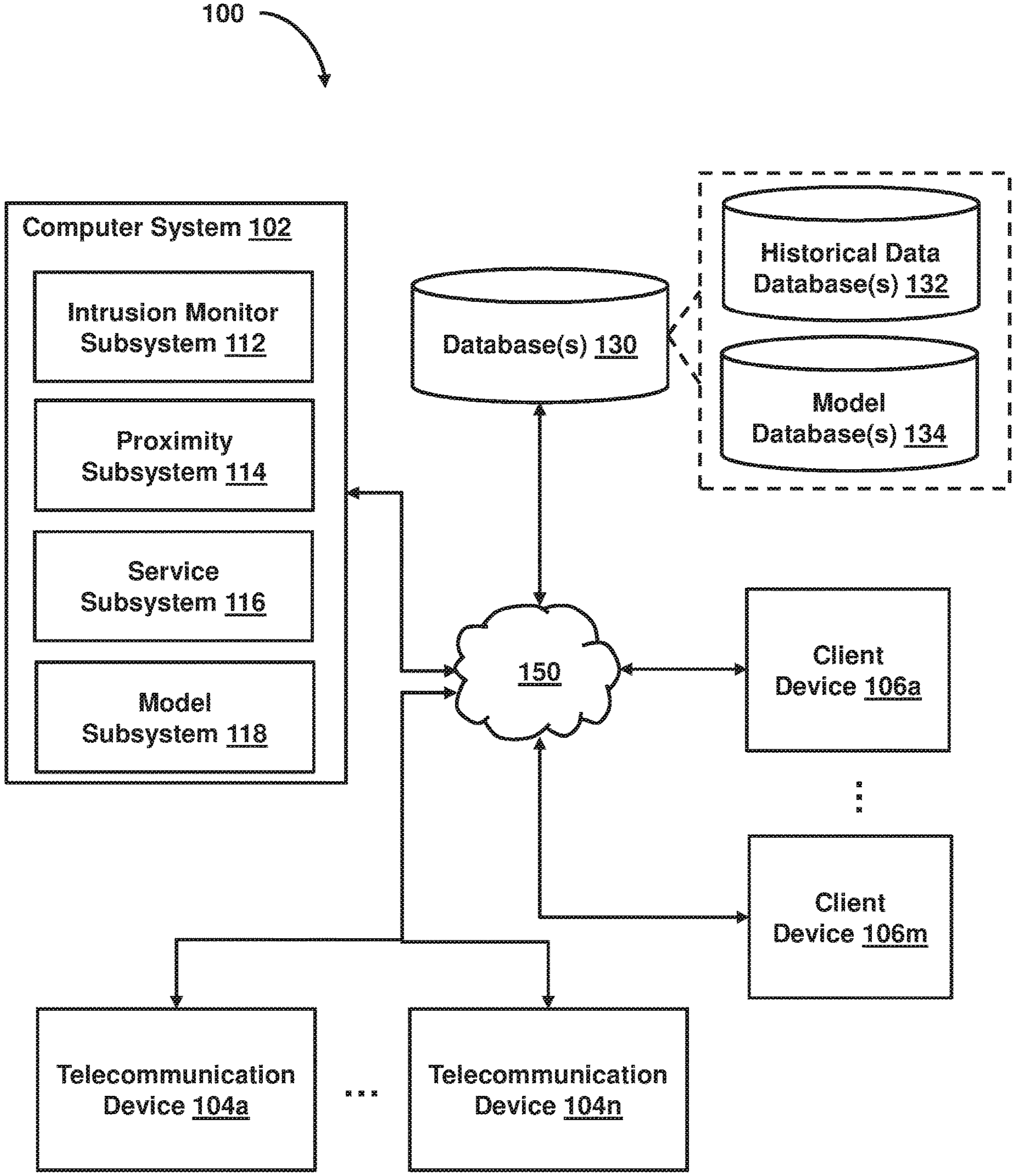
FIG. 1 shows a system for telecommunication devices, in accordance with one or more embodiments.

FIG. 1 shows a system 100 for telecommunication devices, in accordance with one or more embodiments. For example, system 100 may be used to prevent a telecommunication device from being infected with malware. In some embodiments, system 100 may be a cybersecurity system used to detect telecommunication devices that may be infected with malware, prevent telecommunication devices from being infected with malware, and/or cause one or more actions to be performed to cure infected telecommunication devices. As shown in FIG. 1, system 100 may include a computer system 102, telecommunication devices 104*a*-104*n* (collectively referred to as "telecommunication devices 104," and individually referred to as "telecommunication device 104"), client devices 106*a*-106*m* (collectively referred to as "client devices 106," and individually referred to as "client device 106"), or other components. Computer system 102 may include an intrusion monitor subsystem 112, a proximity subsystem 114, a service subsystem 116, a model subsystem 118, and/or other components. System 100 may also include database(s) 130, which may include historical data database(s) 132 and model database(s) 134. Each of historical data database(s) 132 and model database(s) 134 may include one or more databases, which may be located at a single facility or may be distributed amongst a number of server sites. As described herein, each of historical data database(s) 132 and model database (s) 134 may be referred to as historical data database 132 and model database 134. Each telecommunication device 104 may include any type of mobile terminal, fixed terminal, or other device. By way of example, telecommunication device 104 may include a desktop computer, notebook computer, a tablet computer, a smart phone, a wearable device, an automated teller machine (ATM), a card reader, a transit gate, a toll booth, a virtual terminal, an interactive kiosk, a financial service kiosk, or other telecommunication device. Users may, for instance, utilize one or more of telecommunication devices 104*a*-104*n* to interact with one or more servers or other components of system 100. Each client device of 106*a*-106*m* may include any type of mobile terminal, fixed terminal, or other device. By way of example, client device 106 may include a desktop computer, a notebook computer, a tablet computer, a smartphone, a wearable device, or other client device. Users may, for instance, utilize one or more of client devices 106*a*-106*n* to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 106. It should be noted that, although some embodiments are described herein with respect to machine learning models, other prediction models (e.g., statistical models or other analytics models) may be used in lieu of or in addition to machine learning models in other embodiments a statistical model replacing a machine learning model and a non-statistical model replacing a non-machine-learning model in one or more embodiments).

In some embodiments, system 100 may facilitate improving cybersecurity for telecommunication devices. Telecommunication devices may handle sensitive information pertaining to a user. "Sensitive information" refers to information that is private, restricted, or classified, and should otherwise not be available for public dissemination. Some examples of "sensitive information" include, but are not limited to, (which is not to imply that other lists are limiting), financial information of a user (e.g., credit/debit card numbers, transaction information, available balances, credit scores), personal information (e.g., social security numbers, phone numbers, home addresses, etc.), security information (e.g., passcodes, passphrases, etc.), and/or other information. Therefore, it is in the best interests of the user to protect this sensitive information. However, it is also in the best interests of all users of telecommunications devices to ensure that these telecommunications devices are able to be used whenever they are needed. In order to protect a user's sensitive information and also to ensure that the telecommunication devices are available for use, system 100 may provide improved mechanisms for increasing the cybersecurity of telecommunication devices while ensuring that services of the telecommunication devices do not experience too much time offline.

As described herein, a "telecommunications device" refers to any device that a user may interact with to perform a task associated with a service, receiving information from, or communicating with one or more systems. Some examples of telecommunications devices include, but are not limited to, (which is not to imply that other lists are limiting), an automated teller machine (ATM), kiosk, card reader, transit gate, toll booth, a virtual terminal, an interactive kiosk, a financial service kiosk, or other telecommunication device that hosts transactions.

In particular, computer system 102 may be configured to obtain activity log data from multiple telecommunication devices 104 that are located at different geographic locations and determine if software was loaded onto, or attempted to be loaded onto, the telecommunication devices. Computer system 102 may then detect if the software that was loaded, or attempted to be loaded onto the telecommunication devices is malicious software (e.g., malware). Malicious software, or malware, is designed to inflict damage to a device by causing unwanted and/or unwarranted acts to be performed by the device. One example of malware is Ransomware, which causes a device or system to publish data, such as sensitive user data, or prevent the device or system from performing one or more actions, unless a ransom is paid by an entity. Other types of malware may cause a device to perform an action that the device otherwise should not perform.

In some embodiments, computer system 102 may be configured to parse the activity log data of telecommunication devices 104 to determine if any candidate events indicative of software being loaded or attempted to be loaded onto a telecommunications device are present. The activity log data may include data related to events that were detected by the telecommunication device. For instance, the activity log data may store records of every event that the telecommunication device is associated with. For example, a record may be generated and stored in the activity log data for events such as software being loaded onto the telecommunication device, an attempt to load software onto the telecommunication device, times/dates of each interaction with the telecommunication device, external devices that were input to the telecommunication device, and/or other events. In general, most events are innocuous, and therefore identifying possible malicious events is a vital step in ensuring the safety of the sensitive information accessible via the telecommunication devices.

In some embodiments, parsing the activity log data may reveal one or more instances of potentially malicious software (e.g., malware) being loaded or attempting to be loaded onto one or more telecommunication devices. Each instance of potentially malicious software being loaded or attempting to be loaded onto a telecommunication device may be classified by computer system 102 as a candidate event. In some embodiments, computer system 102 may include a classifier configured to analyze the activity log data in order to detect candidate events. The classifier may be trained based on previously detected events of malicious software loading to telecommunication devices. After detecting candidate events from the activity log data, computer system 102 may add the candidate events to a list of detected candidate events, where the list includes each detected candidate event, a timestamp associated with when the candidate event occurred, an identifier associated with a telecommunication device with which the candidate event was detected, and/or other information. In some embodiments, in response to detecting a candidate event, a service or services associated with the telecommunication device with which the candidate event was detected may be added to a candidate list of services to be disabled. For example, if a candidate event was detected as occurring at a first telecommunication device, a service of the telecommunication device (e.g., an information retrieval service, an item retrieval service, a communication service, etc.) may be added to a candidate list of services that may be disabled. By adding the candidate event to the candidate list of services to be disabled, instead of automatically disabling the service, the telecommunication device may still be operational while further analysis is performed to determined whether the candidate event is an actual malicious software load attempt. As false positives can occur, adding the candidate event to the candidate list instead of automatically disabling the service (or multiple services) of the telecommunication device ensures that the telecommunication device can still perform other important tasks and is accessible to users.

In some embodiments, computer system 102 may detect, based on the activity log data of a single telecommunication device, as well as additional activity log data of additional telecommunication devices, records of the candidate event. For example, computer system 102 may detect, in activity log data of telecommunication device 106*a*, a record of a candidate event of possible malicious software being loaded or attempting to be loaded to telecommunication device 106*a*. Furthermore, computer system 102 may detect, in activity log data of one or more other telecommunication devices 104, records of the same or similar candidate event occurring in association with the other telecommunication devices 104. In some embodiments, computer system 102 may identify a set of telecommunication devices with which the candidate event was detected. The set of telecommunication devices may include telecommunication devices that are located at a same or different geographical location as the first telecommunication device. For example, the set of telecommunication devices may include telecommunication device 106*m*, which may be located at a different geographic location than telecommunication device 106*a*. In some embodiments, computer system 102 may store telecommunication device identifier information such as identifiers, Internet Protocol addresses, serial numbers, or other information that is specific to each telecommunication device that is identified as having a candidate event in the activity log data. The telecommunication device identifier information may be stored in a database, memory, computer memory, or other storage means. Additionally, the telecommunication device identifier information may be stored in the form of a list, graph structure, tree structure, array, dictionary, or other data structure for quick lookup.

In some embodiments, computer system 102 may determine which telecommunication devices from the set of telecommunication devices satisfy a proximity threshold condition. The proximity threshold condition may be satisfied when a given telecommunication device is determined to be within a predefined distance of a selected telecommunication device. For example, telecommunication devices that satisfy the proximity threshold condition may be within a predefined threshold distance of the first telecommunication device (i.e., the telecommunication device with which a candidate event was detected). Each of telecommunication devices 104 may be located in different geographic locations, and therefore computer system 102 may determine how many (if any) telecommunication devices included in the set of telecommunication devices are proximate one another. This number of proximate telecommunication devices may be based on a proximity threshold condition. For instance, the proximity threshold condition may be a quantitative value (e.g., a number, value, integer, floating point, etc.) and may represent a distance that each telecommunication device of the set of telecommunication devices are located with respect to one another. In some embodiments, the first telecommunication device may act as a center-point for a geographic radius such that computer system 102 may determine how many other telecommunication devices of the set of telecommunication devices also have the same or similar candidate event within each of their own respective activity log data. The predefined threshold distance may be a predetermined distance or radius size based on a variety of factors. As an example, if the general geographic region is mountainous, the predefined threshold distance may be that of a shorter distance or radius because of the difficulties of a nefarious entity traveling to upload harmful software onto the telecommunication devices. If the general geographic region is flat (e.g., a desert), then the predefined threshold distance may be a longer distance or radius because a nefarious entity may be able to travel more easily. The predefined threshold distance may, for example, be less than 1 mile, less than 5 miles, less than 10 miles, less than 20 miles, less than 100 miles, less than 1,000 miles, or other distance values.

In response to determining which telecommunication devices included in the set of telecommunication devices satisfy the proximity threshold condition, computer system 102 may determine whether a number of telecommunication devices that satisfy the proximity threshold condition also satisfy a density threshold condition indicative of a malware intrusion/installation attempt. The density threshold condition may be satisfied when a number of telecommunication devices that satisfy the proximity threshold condition is greater than or equal to a threshold number of telecommunication devices. In some embodiments, the threshold number of telecommunication. devices may be related to a total number of telecommunication devices with which activity log data is analyzed, a total number of telecommunication devices determined to be proximate to a given telecommunication device, or other criteria. For instance, the density threshold condition may consist of a value, a percentage, ratio, or other metric that indicates a value of telecommunication devices indicating the candidate event as compared to telecommunication devices that do not indicate the candidate event. As an example, the threshold number of telecommunications devices may be a percentage of telecommunications devices that the candidate event was detected for that also satisfy the proximity threshold condition to telecommunications devices that the candidate event was detected for but do not satisfy the proximity threshold condition. The threshold number may be 75% or more telecommunication devices, 80% or more telecommunication devices, 90% or more telecommunications devices, or other values.

In some embodiments, satisfying proximity threshold condition and the density threshold condition may cause one or more services of a telecommunication device to be disabled or enabled. For example, an ability of the telecommunication device to disseminate information, items, content, or perform other actions may be suspended for a predefined period of time. In this way, a service of a first telecommunication device may not be disabled immediately in response to detecting a potential malicious act. However, in response to determining that multiple other telecommunications devices located nearby to the first telecommunication device also detected the same candidate event, the service at the first telecommunication device, as well as, or alternatively, at the other telecommunications devices, may be disabled. This can prevent a possible massive intrusion event from infecting a fleet of telecommunications devices while also ensuring that a falsely identified malicious act does not disable services of a given telecommunication device.

Additionally, other factors, such as the time that has passed since a candidate event was detected on one telecommunication device with respect to other telecommunication devices, the layout of the geographic region, a type of event detected, how the software was loaded or attempted to be loaded (e.g., via Wi-Fi, USB, etc.), may be used as criteria for determining whether to disable or enable one or more services of a telecommunications device. In some embodiments, one or more services of a telecommunication device may be disabled or enabled in response to a temporal threshold condition being satisfied. The temporal threshold condition may be satisfied if candidate events are detected by, or determined to occur at, one or more other telecommunications devices within a particular temporal window of a candidate event being detected by, or being determined to occur at, a first telecommunication device. The temporal window refers to an amount of time between two events, such as an amount of time between when a candidate event is determined to occur within the activity log data of a first telecommunication device and when another candidate event is determined to occur within the activity log data of a second telecommunication device. If the amount of time (e.g., the temporal window) is less than or equal to a threshold amount of time (e.g., less than 1 day, less than 1 hour, less than 1 minute, etc.), then computer system 102 may determine that the temporal threshold condition is satisfied.

In some embodiments, in response to the proximity threshold condition, the density threshold condition, or other threshold conditions being satisfied, computer system 102 may cause one or more services of the first telecommunication device to be disabled. As an example, the services of a telecommunication device may be related to issuing tickets or other items. As another example, the services of a telecommunication device may be a service related to a financial transaction such as withdrawing money, depositing money, checking one or more account balances, depositing a check, checking account information and the like. In some cases, the services offered by a telecommunication device may deal with sensitive personal information of a user, and therefore in order to protect unwanted dissemination of that information, one or more of these services may be disabled responsive to certain criteria being met, such as a proximity threshold condition, a density threshold condition, a temporal threshold condition, or other conditions being satisfied. In some embodiments, the one or more services may be disabled for a predetermined amount of time such that the candidate event may be analyzed and verified as being a true instance of malicious software being loaded onto, or being attempted to be loaded onto, a telecommunication device, or if the candidate event is a false positive. In this way, computer system 102 may offer protection to users of the telecommunication devices without the telecommunication devices experiencing too much down time, providing better user satisfaction and experience with the telecommunication devices, and ensuring that the telecommunications device are available for use when needed by users as much as possible.

Subsystems 112-118

Intrusion monitor subsystem 112 may be configured to obtain activity log data relating to interactions associated with a plurality of telecommunication devices 104. In some embodiments, the activity log data may be retrieved responsive to a request from computer system 102 to each telecommunication device. Alternatively or additionally, each telecommunication device 104 may be configured to send activity log data, or portions of the activity log data for that telecommunication device 104, to computer system 102. The activity log data may also be provided directly to historical database 132, which may be configured to store the activity log data for each telecommunication device 104. In some embodiments, historical data database 132 may store the activity log data for each telecommunication device 104 in one or more data structures. The data structures may be organized by device identifiers of each telecommunication device 104, as well as temporally. For example, a record of each update to an activity log may be stored in a data structure associated with the corresponding telecommunication device with which the update was received. In some embodiments, computer system 102 may be configured to provide the activity log data to historical data database 132 in response to the activity log data, or the updates to the activity log data, being obtained.

As mentioned above, the activity log data may store records of each event that occurred in association with a given telecommunication device 104. The records included in the activity data log reflect actions performed to, or by, telecommunication device 104. For example, tasks executed by telecommunication device 104, external devices input to telecommunication device 104, items or devices removed or distributed from telecommunications device 104, data received via a communications component (e.g., file transmitted across network 150), or other actions, may each cause a record to be generated and stored within the activity data log for telecommunication device 104. Each record may include a timestamp indicating a time that the given action was recorded by telecommunication device 104. In some embodiments, the activity log data may include information related to activities that occur on a telecommunication device such as software that has been loaded onto telecommunication device 104, the times/dates that an activity occurs, an identifier associated with telecommunication device 104 (e.g., a MAC address, an IP address, a serial number, etc.), telecommunication device 104 location information, authentication data, the name of an activity, or any other event that may occur on a telecommunication device.

In some cases, one or more of telecommunications devices 104 may be located at a same geographic location (e.g., two or more telecommunications devices may reside a same location), while some of telecommunications devices 104 may reside at different geographic locations. As an example, referring to FIG. 2, a system 200 shows telecommunication devices 104*a*-104*n* located at different geographic locations. In some embodiments, intrusion monitor subsystem 112 may obtain the activity log data from each of telecommunication device 104*a*-104*n*. In some embodiments, each of telecommunication devices 104*a*-104*n* may periodically (e.g., every day, every hour, every minute, every second, etc.) provide historical data database 132 with activity log data or updates to their activity log data such that historical data database 132 always has an up-to-date version of that telecommunication device's activity log data. The activity log data or updates thereto may be provided automatically at a given cadence, in response to requests from computer system 102, or a combination thereof. Computer system 102 may provide the activity log data to historical data database 132 for storage. In some embodiments, intrusion monitor subsystem 112 may obtain the activity log data from historical data database 132 for each respective telecommunication device 104. Each of telecommunication devices 104 may, in addition to, or instead of, providing their activity log data to computer system 102, provide the activity log data to historical data database 132 for storage. In this way, computer system 102 may reduce network traffic by sending requests and receiving activity log data for each telecommunication device 104 in response to a single request as opposed to sending multiple requests and receiving multiple data packets for activity log data.

Figure 3:
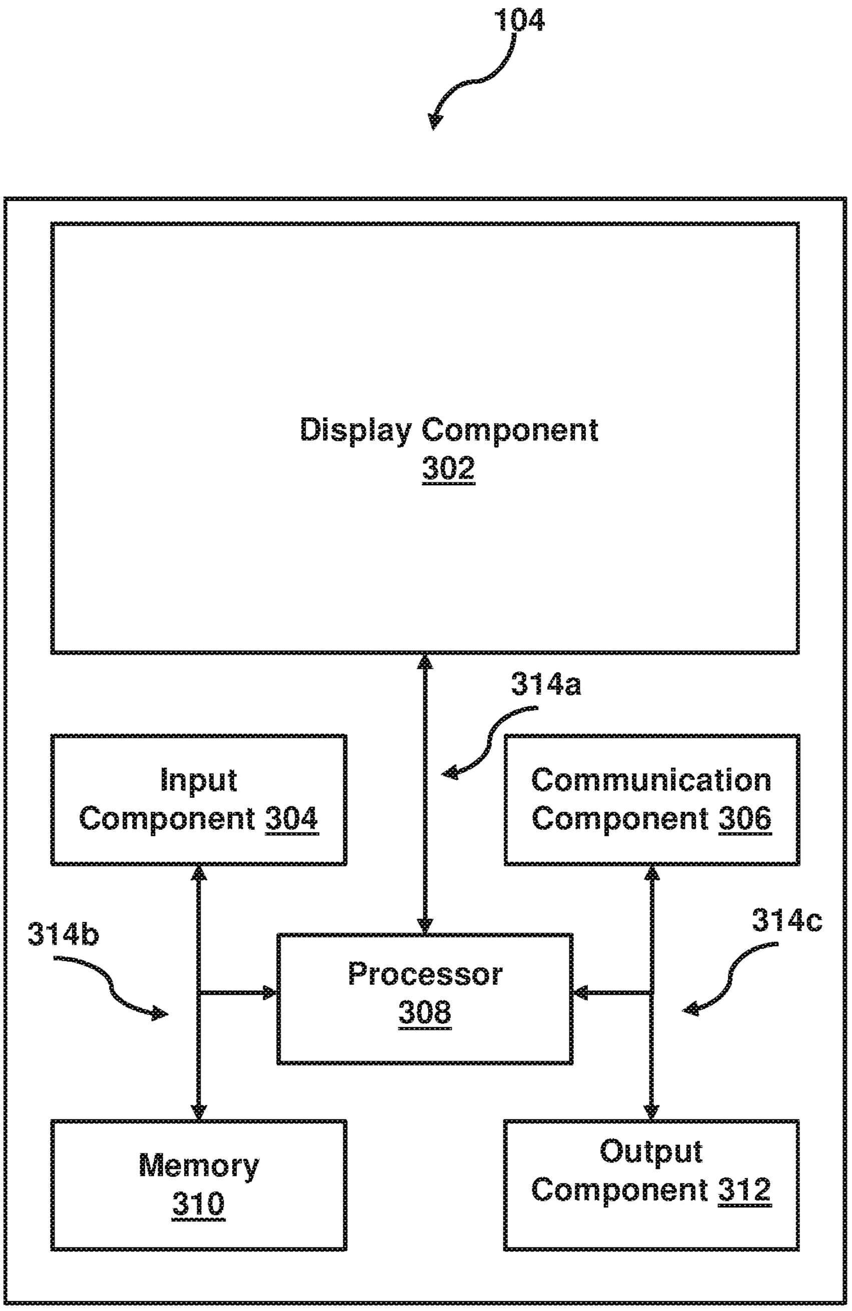
FIG. 3 shows a diagram of an example telecommunication device, in accordance with one or more embodiments.

FIG. 3 shows a diagram of telecommunication device 104, in accordance with one or more embodiments. In some embodiments, telecommunication device 104 may include a display component 302, an input component 304, a communication component 306. one or more processors 308, memory 310, an output component 312, and communication pathways 314*a*-314*c*. Display component 302 may be configured to display information to a user. The information may relate to one or more services provided by telecommunications device 104. The services may include, but are not limited to, (which is not to imply that other lists are limiting), options for retrieving and/or inputting items or content from telecommunication device 104 (e.g., withdrawing/depositing money, obtaining hoarding passes, obtaining tickets, obtaining postage stamps, etc.), providing personal information relating to an account of a user with a particular service (e.g., user account information, financial information, medical information, etc.), facilitating communications with other telecommunication devices 104 and/or client devices 106, or other functions. Display component 302 may also be configured to display an interactive user interface (UI) to allow a user to interact with telecommunication device 104. In some embodiments, display component 302 may be configured to detect inputs from a user. For example, display component 302 may be a touch-sensitive interactive display configured to detect touch inputs from a user.

Input component 304 may include one or more inputs for interacting with telecommunication device 104 such as buttons, touch screens, joy sticks, keypads, USB ports, SD card reader ports, floppy-disk ports, CD drives, DVD drives, card readers, card scanners, Near Field Communication (NFC) readers, and the like. A user may input an item to telecommunication device 104 via input component 304 to access one or more services of telecommunication device 104. For example, a user may insert a card into a card reader, press one or more buttons on a keypad, or perform other actions, to authenticate the user for accessing information via telecommunication device. In some embodiments, input component 304 may include voice detection functionalities, retinal scanning, facial recognition, fingerprint scanning functionality, or other biometric identification mechanisms. In some embodiments, input component 304 may detect the presence of other electronic devices proximate to telecommunication device 104, and may authorize access to one or more services of telecommunication device 104 based on data communicated from/to the detected electronic devices.

Communication component 306 may be configured to receive, provide, or otherwise exchange information with one or more components of telecommunication device 104. other components of system 100, or other devices. In some embodiments, the information may be exchanged over network 150 via wired or wireless techniques Ethernet, fiber optics, coaxial cable, Wi-Fi, Bluetooth, near field communication, or other technologies). For example, communication component 306 may exchange information with telecommunication devices 104, databases 130, client device 106, or other components of system 100 over network 150.

Processors 308 may be programmed to provide information processing capabilities for telecommunication device 104. Processors 308 may include one or more of a digital processor, an analog processor, a digital circuit designed to process information, an analog circuit designed to process information, a state machine, and/or other mechanisms for electronically processing information. In some embodiments, processors 308 may include a plurality of processing units.

These processing units may be physically located within the same device, or the processors may represent processing functionality of telecommunication devices 104 operating in coordination. Processors 308 may be programmed to execute computer program instructions to perform functions related to telecommunication device 104. Processors 308 may be programmed to execute computer program instructions by software; hardware; firmware; some combination of software, hardware, or firmware; and/or other mechanisms for configuring processing capabilities on the processors.

Memory 310 may include one or more electronic storages that may include non-transitory storage media that electronically stores information therein. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein. Additionally, memory 310 may store information related to the one or more services of the telecommunication device 104, activity log data, timestamp data with respect to events that occur on telecommunication device 104, or other data that occurs on telecommunication device 104.

Output component 312 may include one or more components configured to output information, items, communications, or other data to one or more users, client devices (e.g., client devices 106), other telecommunication devices 104, or other components of system 100. For example, output component 312 may include USB ports, SD card ports, service ports, cash dispenser, ticket dispensers, speakers, printers, display screens, or other output ports.

Communication pathways 314*a*-314*c* may be that of either wired or wireless connections such that each component of telecommunication device 104 may be able to exchange information from one component to another.

In response to obtaining activity log data from each telecommunication device 104 or from. historical data database 132, intrusion monitor subsystem 112 may parse the activity log data to identify any instances of possible software being loaded onto or attempting to be loaded onto telecommunication device 104. In some embodiments, intrusion monitor subsystem 112 may include a classifier trained to recognize character strings in data logs that are indicative of malicious software, or that are unrecognized by the classifier. Additionally, intrusion monitor subsystem 112 may be configured to determine whether any external devices were inserted into an input port of telecommunication device 104 and, if so, determine the actions performed subsequent to those external devices being input to telecommunication device 104. In some embodiments, software or other data provided to telecommunication device 104 may be harmful (e.g., malware). This harmful software, which is often referred to as malware, may cause telecommunication device 104 to disseminate sensitive information, disperse items, dispute operations of one or more services, or cause other unwanted actions to occur. For example, malware loaded onto telecommunication device 104 may provide a malicious entity an entity that caused the malware to be loaded to telecommunication device 104) with sensitive information related to one or more users (e.g., social security information, banking information, residential information, medical information, etc.).

The activity log data may be stored as a text file, list, graph structure, tree structure, array, dictionary, or other data structure for quick lookup. The activity log data may include information about activities performed by or performed to telecommunication device 104. In some embodiments, the activity log data may associate an activity with information including the telecommunication device 104 identifier (e.g., a serial number associated with the telecommunication device), the name of the activity (e.g., a loading of software, a system update, a transaction, a withdrawal, a deposit, etc.), a timestamp at which the activity occurred, a date stamp at which the activity occurred, location information, authentication data, or other information. Intrusion monitor subsystem 112 may parse through the activity log data and determine whether a particular event included in the activity log data indicates a loading of software, particular unrecognized software, which could potentially be an attempt to load malware to telecommunication device 104. For instance, in most cases when a system update occurs, system administrators will push the software update (e.g., either wirelessly or via a manual connection to telecommunication device 104) and will include an authentication value to indicate that the software that was loaded is authentic software. Not only is an authentication value included in a system update, but the authentication value may be stored in association with the corresponding event in the activity log data. Thus, when a nefarious entity tries to load malware on a telecommunication device, intrusion monitor subsystem 112 may determine that either the name and/or the authentication value associated with the activity is not authentic. Therefore, intrusion monitor subsystem 112 may flag that a particular event in the activity log as a candidate event, indicating a possible attempt to load malware to telecommunication device 104.

In some embodiments, candidate events indicative of malware being loaded onto or attempting to be loaded onto telecommunication device 104 may be determined based on a timestamp associated with a given candidate event. For instance, system updates may be pushed to one or more telecommunication devices 104 during different time periods, such as during early morning hours (e.g., 2:00 AM-5:00 AM) when interactions with telecommunication devices 104 are expected to be minimal. 1*f*, however, software loads to telecommunication device 104 are detected during time periods when interactions with that telecommunication device 104 are frequent (e.g., during normal business hours, such as 9:00 AM-5:00 PM), this may indicate a possible attempt to install malware to telecommunication device 104. Therefore, by identifying a timestamp and action associated with a candidate event, intrusion monitor subsystem 112 may determine whether a given record in the activity log data is a candite event to be flagged. Therefore, intrusion monitor subsystem 112 may detect based on the timestamps at which a third-party installation of software may occur to be a candidate event for a malware intrusion attempt.

In some embodiments, intrusion monitor subsystem 112 may detect candidate events from the activity log data of a telecommunication device 104 based on other actions performed to telecommunication device 104. For example, if an entity has attempted to access one or more services of telecommunication device 104 by entering identification information (e.g., password, retinal scan, biometric identifier, etc.), but the identification information was not recognized as being associated with an authorized entity, then attempts to load software to that telecommunication device 104 subsequent (e.g., within a few minutes of the log-in attempts) may be flagged as possible candidate events.

In some embodiments, intrusion monitor subsystem 112 may determine, from the activity log data, whether an external device (e.g., a USB stick, mobile device, etc.) was connected to a telecommunication device 104. For example, the activity log data may indicate any instances of a USB drive being inserted into a USB port of telecommunication device 104. If identified, intrusion monitor subsystem 112 may determine whether software or other data was transferred, or attempted to be transferred (e.g., loaded) to telecommunication device 104 from the USB drive. If such actions occurred, the records in the activity log data of these actions may be flagged as candidate events.

In some embodiments, in response to detecting a candidate event within the activity log data of a first telecommunication device 104, intrusion monitor subsystem 112 may determine whether any other telecommunication devices 104 also detected the candidate event within their respective activity log data. Intrusion monitor subsystem 112 may analyze the activity log data of each telecommunication device 104 included in system 100 to identify a set of telecommunication. devices for which the candidate event was detected. For example, intrusion monitor subsystem 112 may parse the activity log data from each of telecommunication devices 104 and identify whether a candidate event that is the same or similar to the candidate event detected within the activity log data of a first telecommunication device 104 was also detected. In some embodiments, intrusion monitor subsystem 112 may analyze a subset of telecommunication devices 104 based on a relationship between each telecommunication device 104 and the first telecommunication device 104. For instance, intrusion monitor subsystem 112 may analyze the activity log data of any telecommunication device located within a predefined distance of a first telecommunication device.

To determine whether the candidate event was detected within the activity log data of any other telecommunication devices 104, intrusion monitor subsystem 112 may compare each record included in the activity log data of each additional telecommunication device 104 with the record flagged as being a candidate event in the activity log data of the first telecommunication device. Intrusion monitor subsystem 112 may compare the name of the activity of a given record, the timestamps of the activity, the authentication data associated with the record, location information of a corresponding telecommunication device 104, or other information, or a combination thereof, with the record flagged as being a candidate event. As an example, intrusion monitor subsystem 112 may compute a similarity score (e.g., an L2 distance) between a character string (e.g., title, software name, etc.) stored in association with the record flagged as being a candidate event with a record included within the activity log data of a given telecommunication device 104. If the similarity score exceeds a threshold score (e.g., 75% or more similar, 85% or more similar, 95% or more similar, etc.), then intrusion monitor subsystem 112 may flag the analyzed record as also being a candidate event, and may add the corresponding telecommunication device 104 to a list of telecommunication devices 104 with which the candidate event was detected. As an example, with reference to FIG. 2, intrusion monitor subsystem 112 may determine a candidate event indicative of an attempt to load malware to a first telecommunication device, telecommunication device 104*a*, was detected within activity log data of telecommunication device 104*a*. In response to determining that the candidate event was included in the activity log data of telecommunication device 104*a*, intrusion monitor subsystem 112 may retrieve activity log data for some or all of the other telecommunication devices 104*b*-104*n* of system 200. In some embodiments, intrusion monitor subsystem 112 may retrieve activity log data of a subset of telecommunication devices 104*b*-104*n*. For example, if there are 1,000 telecommunication devices in a fleet of telecommunication devices, then telecommunication devices 104*a*-104*n* may represent a subset of the telecommunication devices. The telecommunication devices that are selected for the subset, and with which activity log data is retrieved for, may be determined based on location proximity to the first telecommunication device, an availability of activity log data for those telecommunication devices, a recency with which the activity log data has been updated for those telecommunication devices, or other criteria.

Figure 2:
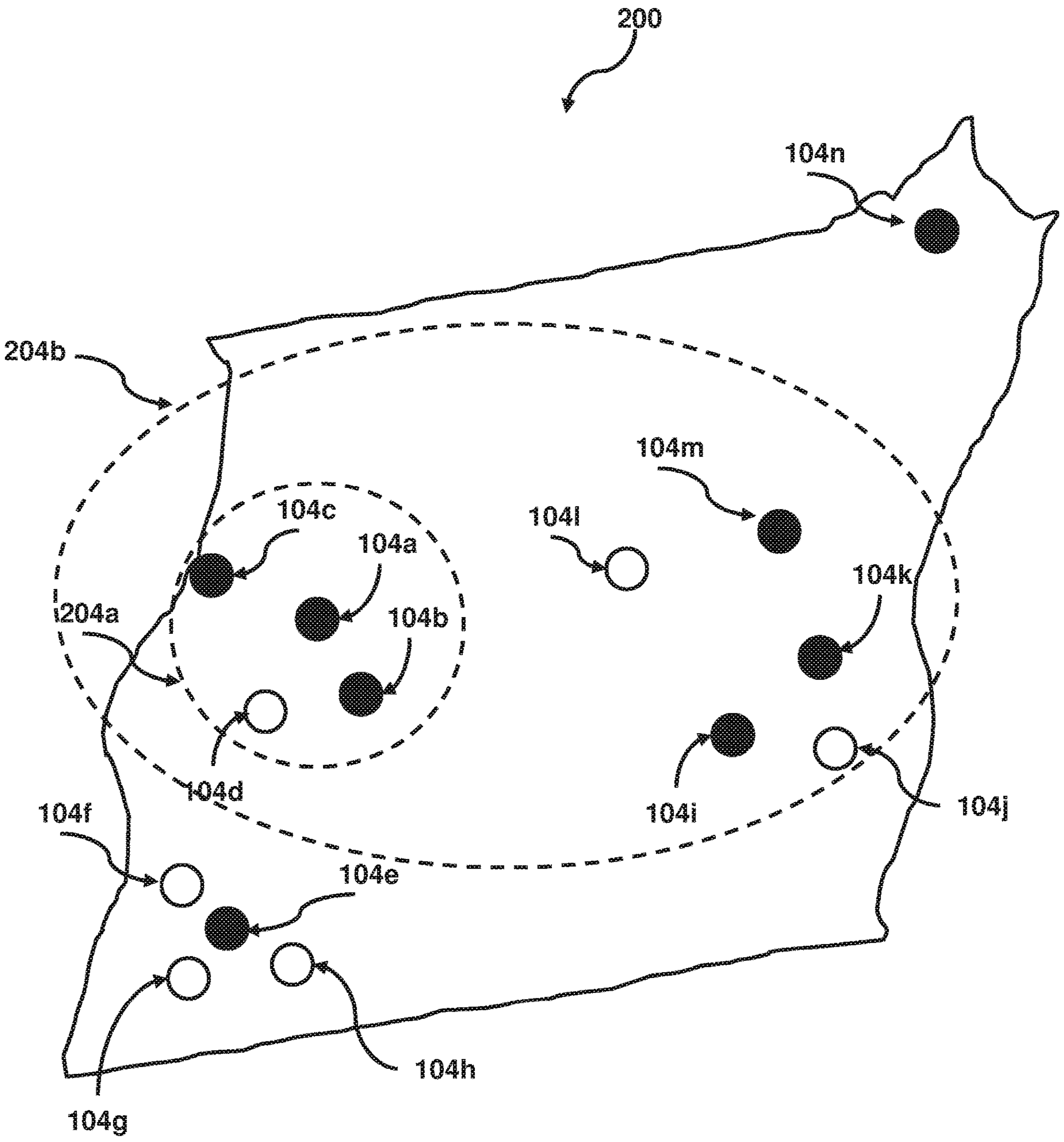
FIG. 2 shows a diagram of geographic region including telecommunication devices with which a malicious activity has been detected, in accordance with one or more embodiments.

In response to retrieving the activity log data of the other telecommunication devices (e.g., telecommunication devices 104*b*-104*n*), intrusion monitor subsystem 112 may determine whether the candidate event was detected for the other telecommunication devices. As seen in FIG. 2, of telecommunication devices 1046-104*n*, the candidate event was detected within the activity log data of telecommunication devices 104*b*, 104*c*, 104*e*, 104*i*, 104*k*, 104*m*, and 104*n*. In some embodiments, intrusion monitor subsystem 112 may be configured to add a device identifier for each of telecommunication devices 104*a*-104*c*, 104*e*, 104*i*, 104*k*, 104*m*, and 104*n* to a list of telecommunication devices with which the candidate event was detected.

Proximity subsystem 114 may be configured to determine a number of telecommunication devices located proximate to a first telecommunication device. In some embodiments, proximity subsystem 114 may determine which, if any, telecommunications devices from the list of telecommunications devices are also proximate to a first telecommunication device. As an example, with reference to FIG. 2, the list of candidate devices with which the candidate event was detected includes telecommunication devices 104*a*-104*c*, 104*e*, 104*i*, 104*k*, 104*m*, and 104*n*. In some embodiments, proximity subsystem 114 may determine, from the list of candidate telecommunication devices, which telecommunication devices satisfy a proximity threshold condition. The proximity threshold condition may be satisfied if a given telecommunication device is located within a threshold distance of a particular telecommunication device. For example, the proximity threshold condition may be satisfied if a second telecommunication device, telecommunication device 104*b*, is within a threshold distance from a first telecommunication device, telecommunication device 104*a*. The threshold distance may be predefined or dynamically adjusted. For instance, the threshold distance may be predefined as a first distance, however based on the number of telecommunication devices for which the candidate event is detected increasing, proximity subsystem 114 may be configured to adjust the threshold distance from the first distance to a second distance, where the second distance may be larger than the first distance. Examples of the threshold distance may be 1 foot or less, 3 feet or less, 10 feet or less, 100 feet or less, 500 feet or less, 1 mile or less, 10 miles or less, 25 miles or less, 100 miles or less, or other distances.

Proximity subsystem 114 may be configured to filter the list of candidate devices based on the proximity threshold condition such that the telecommunication devices that remain within the list include telecommunication devices that satisfy the proximity threshold condition. For example, proximity subsystem 114 may determine that, of the telecommunication devices included in the list of candidate telecommunication devices (e.g., telecommunication devices 104*a*-104*c*, 104*e*, 104*i*, 104*k*, 104*m*, and 104*n*), telecommunication devices 104*b* and 104*c* satisfy the proximity threshold condition with respect to the first telecommunication device, telecommunication device 104*a*. For example, each of telecommunications devices 104*b* and 104*c* are within a predefined threshold distance 204*a* of first telecommunication device 104*a*. As another example, each of telecommunication devices 104*b*, 104*c*, 104*i*, 104*k*, and 104*m* are within a predefined distance 204*b* of first telecommunication device. Depending on the size, shape, geographic constraints, line of sight, accessibility, or other criteria related to the telecommunication devices, the number of telecommunication devices that are filtered out of the list of candidate telecommunication devices may vary. For example, predefined threshold distance 204*a* may be substantially circular about a center point, which corresponds to a location of first telecommunication device 104*a*. However, predefined threshold distance 204*b* may be substantially elliptical about a center point of system 200 (e.g., a communications network that includes each of telecommunication devices 104*a*-104*b*). Based on the predefined distances 204 and 204*b*, telecommunication devices 104*e* and 104*n*, which are both included in the list of candidate telecommunication devices with which the candidate event was detected for, may be filtered out for not satisfying the proximity threshold condition. To ensure that a maximum amount of telecommunication devices that detected the candidate event are included when determining whether the proximity threshold condition, proximity subsystem 114 may be configured to continually adjust the size, shape, or other aspects of the threshold distance until no new telecommunication devices with which the candidate event was detected are identified. For example, proximity subsystem 114 may increase the predefined threshold distance 204*a* such that it is large enough to include telecommunication devices 104*e* and 104*n*, and then again increase the threshold distance to determine if any new telecommunication devices are identified that also had the candidate event detected. If so, then proximity subsystem 114 may continue to iteratively enlarge the distance and check for new telecommunication devices until the distance is enlarge and no new telecommunication devices that the candidate event was detected for are identified as being included in the new, enlarged, distance.

In some embodiments, a distance between each telecommunication device may be determined beforehand. For example, a distance between telecommunication device 104*a* and 104*b* may be computed prior to determining whether the proximity threshold condition is satisfied. The precomputed distances may then be used to determine whether a given telecommunication device is within a threshold distance of another telecommunication device.

In some embodiments, the proximity threshold condition may be based on an estimated ability of a malicious entity to travel from one location to another to attempt and install the malicious software to different telecommunication devices. As an example, if the general geographic region is mountainous, the threshold distance for the proximity threshold condition may be shorter because of the difficulties of traveling to other telecommunication devices. As another example, if the general geographic region is flat, then the threshold distance for the proximity threshold condition may be longer because it may be easier traveling to other telecommunication devices. The threshold distance for the proximity threshold condition may also be based on an infrastructure of the geographic region, such as an availability of mass transit, roadways, bodies of water, etc.

In some embodiments, proximity subsystem 114 may be configured to determine if the number of telecommunication devices included in the filtered list of candidate telecommunication devices, which may be referred to as "proximate telecommunication devices," also satisfy a density threshold condition. The density threshold condition may be satisfied when the number of telecommunication devices included in the filtered list of candidate telecommunication devices (e.g., telecommunication devices (i) with which the candidate event was detected and (ii) determined to be proximate to a first telecommunication device) is greater than or equal to a threshold number. The threshold number may be based on the total number of telecommunication devices included in the communications network of system 200 (e.g., telecommunication devices 104_a_-104_n_), a number of telecommunication devices included in the list of candidate telecommunication devices (e.g., the telecommunication devices with which the candidate event was detected for), a number of telecommunication devices included in the filtered list of candidate telecommunication devices (e.g. the telecommunication devices that satisfy proximity threshold condition), or other criteria. In some embodiments, the density threshold condition may be based on a ratio or percentage of telecommunication devices that the candidate event was detected on and satisfy the proximity threshold condition as compared to the telecommunication devices the candidate event was not detected on and satisfy the proximity threshold condition. The threshold number may be a value, a percentage, ratio, number, or other metric. The threshold number may be predefined or dynamically adjusted. For example, the threshold number may be 1 or more, 5 or more, 10 or more, and so on. As another example, the threshold number may be a percentage of telecommunication devices with which the candidate event was detected and satisfy the proximity threshold condition as compared to telecommunication devices that the candidate event was detected, such as 75% or more, 85% or more, 90% or more, 95% or more, or other values. In some embodiments, the density threshold condition may be based on geographic locations of the telecommunication devices.

As an illustrative example, for the proximity threshold condition being based on threshold distance 204_a_, satisfaction of the density threshold condition may be determined based on the number of telecommunication devices (i) for which the candidate event was detected and (ii) that satisfy the proximity threshold condition (e.g., telecommunication devices 104_a_-104_c_), and a total number of telecommunication devices included within the threshold distance 204_a_ (e.g., telecommunication devices 104_a_-104_d_). Telecommunication devices 104_a_-104_c_, in this example, represent 75% of the telecommunication devices within threshold distance 204_a_. Therefore, if the threshold number is 75% or more, then telecommunication devices 104_a_-104_c_ may satisfy the density threshold condition.

In some embodiments, service subsystem 116 may be configured to add a first service of a first telecommunication device to a candidate list of services to be disabled based on the candidate event being detected within the activity log data of the first telecommunication device. For instance, in response to determining that the activity log data of first telecommunication device 104_a_ included a record representing a candidate event of software being loaded or attempting to be loaded to first telecommunication device 104_a_, service subsystem 116 may cause a first service of first telecommunication device 104_a_ to be added to a candidate list of services to be disabled. As mentioned above, each telecommunication device 104 may perform or facilitate performance of one or more services, such as disseminating information, distributing items (e.g., tickets, stamps, paper money, etc.), sending a message, retrieving data, etc. In some embodiments, rather than immediately disabling one or more of the services offered by a given telecommunication device, those services may be added to the candidate list such that, if other criteria are met (e.g., proximity threshold condition and/or density threshold condition being satisfied), those services may be disabled. This can avoid disabling services of the telecommunication device for possible false positives detected within the activity log data. However, in some embodiments, detection of the candidate event within the activity log data of a telecommunication device may cause that telecommunication device to have a particular service or services disabled. Additionally, the disablement of a service or services may be permanent or temporary, and may be enabled again in response to other criteria being met.

In some embodiments, responsive to determining that both the proximity threshold condition and the density threshold condition are satisfied, one or more services of the first telecommunication device may be disabled. The services that are disabled may be the same services included in the candidate list of services to be disabled. In some embodiments, additional services of the first telecommunication device may be disabled in response to the proximity threshold condition and the density threshold condition being satisfied. In some embodiments, a same or similar service may be disabled for or more other telecommunication devices in response to the services of the first telecommunication device being disabled. For example, in response to a service of first telecommunication device 104_a_ being disabled, responsive to the proximity threshold condition and the density threshold condition being satisfied by telecommunication devices 104_b_ and 104_c_, the same or similar service of telecommunication devices 104_b_ and 104_c_ may also be disabled. As another example, responsive to the proximity threshold condition and the density threshold condition being satisfied, such as by telecommunication devices 104_a_-104_c_, services of additional telecommunication devices (e.g., telecommunication devices 104_d-n_) may be disabled. In some embodiments, the telecommunication devices having a service disabled may be telecommunication devices with which the candidate event has been detected. In some embodiments, the telecommunication devices having a service disabled may be telecommunication devices with which the candidate event was not detected. For example, in response to determining that telecommunication devices 104_a_-104_c_ satisfy the proximity threshold condition and the density threshold condition, service subsystem 116 may be configured to cause a service of telecommunication device 104_d_ to be disabled even though the candidate event was not detected within activity log data of telecommunication device 104_d_.

In some embodiments, service subsystem 116 may cause a service of one or more telecommunication devices to be disabled in response to the proximity threshold condition, the density threshold condition, and a temporal threshold condition being satisfied. As mentioned above, the temporal threshold condition may be satisfied if an amount of time between when a candidate event occurred on a first telecommunication device and when the candidate event occurred on a second telecommunication device is less than or equal to a threshold amount of time. The threshold amount of time may be less than 24 hours, less than 12 hours, less than 6 hours, less than 1 hour, less than 30 minutes, less than 5 minutes, or other amounts of time. The activity log data for each telecommunication device may include records indicating actions associated with the telecommunication device (e.g., software being loaded or an attempt to be loaded to the telecommunication device, an external device being inserted into an input port of the telecommunication device, an entity interacting with a touch screen of the telecommunication device, items being dispensed from the telecommunication device, etc.). Each record may have a timestamp stored in association with it indicating a time that the particular action occurred. When the candidate event is detected within the activity log data, the timestamp associated with the record of the candidate event may be extracted. Service subsystem 116 may be configured to extract the timestamps and compute a temporal difference between when the candidate event occurred on one telecommunication device and when the candidate event occurred on another telecommunication device. if the temporal difference (e.g., the amount of time) between when the two candidate events occurred on the two different telecommunication devices is less than or equal to the threshold amount of time, then the two telecommunication devices may be classified as satisfying the temporal threshold condition. Service subsystem 116 may be configured to analyze the telecommunication devices that satisfy the proximity threshold condition and the density threshold condition and determine whether the candidate events also satisfy the temporal threshold condition. In some embodiments, service subsystem 116 may remove a telecommunication device from the filtered list of candidate telecommunication devices, telecommunication devices that satisfied the proximity threshold condition and the temporal threshold condition) if that telecommunication device's corresponding candidate event is determined to not satisfy the temporal threshold condition with respect to one or more of the candidate events of the other telecommunication devices included in the filter list. In some embodiments, determination as to whether the temporal threshold condition is satisfied may occur prior to the proximity threshold condition and/or the density threshold condition being analyzed. For instance, upon obtaining the additional activity log data of other telecommunication devices, service subsystem 116 may determine whether any of the candidate events detected by the other telecommunication devices occurred within a threshold amount of time of the candidate event detected by the first telecommunication device. If so, then those telecommunication devices that satisfy the temporal threshold condition may be added to a list to be analyzed with respect to the proximity threshold condition and/or the density threshold condition.

In some embodiments, service subsystem 116 may send a signal to one or more telecommunication devices 104*a*-104*n* to cause one or more services of the telecommunication devices to be disabled. The signal may include an indication of a duration of the disablement. For example, the signal may indicate that a first service of a telecommunication device is to be disabled for an amount of time (e.g., 1 hour, 6 hours, 1 day, etc.). During that time period, the service of the telecommunication device may be rendered disabled such that an entity (e.g., a human) unable to use that service with the telecommunication device. In some embodiments, other services of the telecommunication device may remain operational. In some embodiments, in response to the amount of time with which the service of the telecommunication device is to be disabled elapsing, the disabled services of the telecommunication device may be re-enabled thereby allowing the telecommunication device to resume normal use.

In some embodiments, the signal may not include an indication of a duration of the disablement. In such cases, the service may be disabled until another set of criteria are performed to cause that service to be enabled for the telecommunication device. For example, the service may be enabled in response to a system's administrator performing an authorization procedure to the telecommunication device to cause the service to be activated again.

In some embodiments, if the proximity threshold condition, density threshold condition, and/or temporal threshold condition is/are not satisfied, service subsystem 116 may be configured to prevent a service from being disabled for the telecommunication device. For example, if it is determined that the candidate event was detected for two telecommunication devices that are more than a threshold distance apart from one another, then service subsystem 116 may prevent a given service or services from being disabled for one or both of the telecommunication devices.

In some embodiments, service subsystem 116 may disable services of other telecommunication devices in response to determining that one or more services of the first telecommunication device are to be disabled. For example, in response to determining that a service of first telecommunication device 104*a* is to be disabled, service subsystem 116 may cause the same or a similar service to be disabled for telecommunication devices 104*b* and 104*c*. Furthermore, one or more services of a telecommunication device that the candidate event was not detected for may also be disabled to prevent that telecommunication device from being attacked by any malicious entities. For example, in response to determining that a service of first telecommunication device 104*a* is to be disabled, service subsystem 116 may cause a corresponding service of telecommunication device 104*d*, for which the candidate event was not detected, to be disabled.

Figure 4:
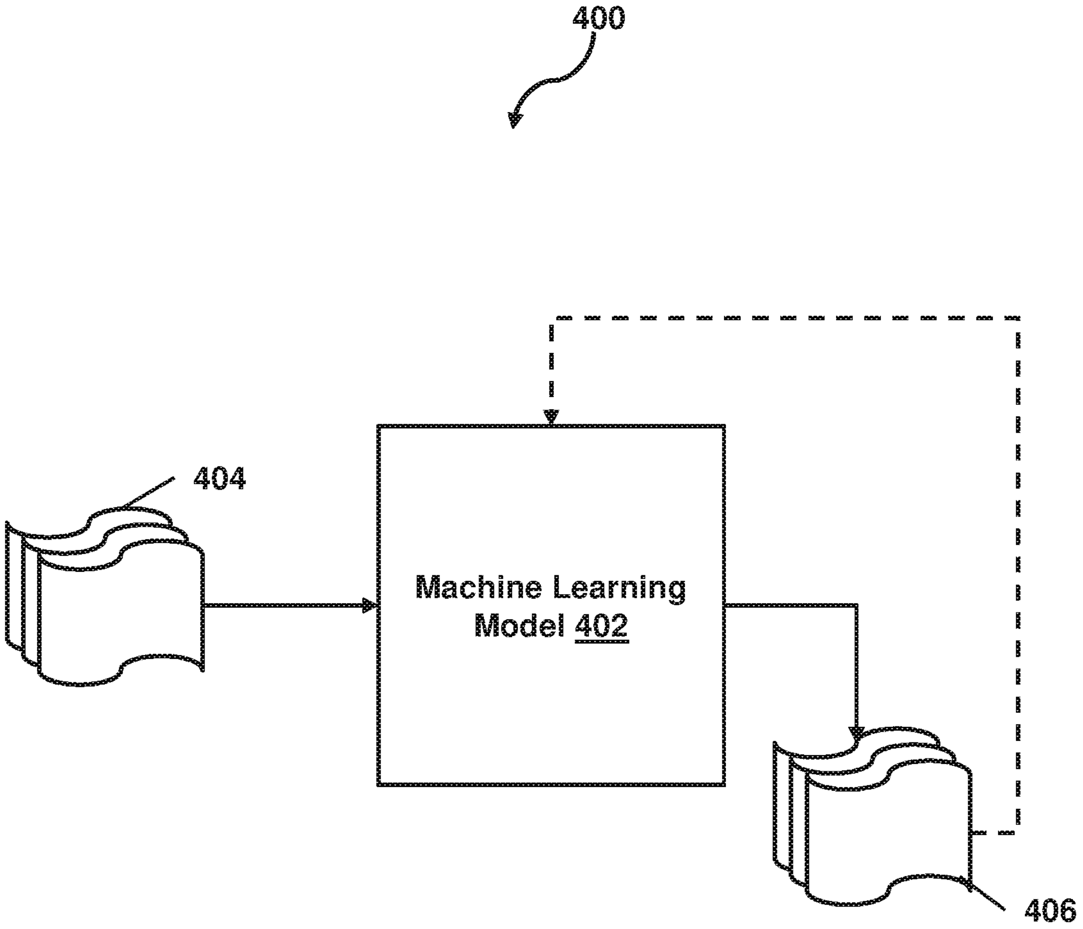
FIG. 4 shows a prediction model trained to detect malware intrusions, in accordance with one or more embodiments.

In some embodiments, model subsystem 118 may be configured to train a prediction model to determine whether a telecommunication device is to have a service disabled. For example, with reference to FIG. 4, a prediction model 402 may be trained to detect malware intrusions, in accordance with one or more embodiments. Training process 400 shows an example of a prediction model 402 trained to take, as input, activity log data 404 of a telecommunication device and output data indicating a likelihood of a candidate event being detected within activity log data 404 of the telecommunication device. Upon being trained, prediction model 402 may be used to determine a likelihood that a given telecommunication device will also experience the same candidate event that other telecommunication devices have or are currently experiencing based on the activity log data of the given telecommunication device, a location of the telecommunication device with respect to the other telecommunication devices, or other criteria.

In some embodiments, activity log data 404 used to train prediction model 402 may include the activity log data of a large number of telecommunication devices with which a candidate event was detected. For example, activity log data 404 may include the activity log data for each of telecommunication devices 104*a*-104*n*. In this example, activity log data 404 may include an indication a label) of whether the candidate event was detected within the activity log data of the corresponding telecommunication device. In some embodiments, prediction model 402 may take, as input, activity log data 404 for telecommunication device 104, and may output an indication of whether a service of telecommunication device 104 should be disabled. Prediction model 402 may be trained using activity log data for a large number of telecommunication devices where each activity log data may include an indication of whether a service of the telecommunication device was disabled.

In some embodiments, prediction model 402 may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

As an example, prediction model 402 may take inputs (e.g., activity log data 404) and provide outputs (e.g., a likelihood that a corresponding telecommunication device is to have a service disabled). In some embodiments, the outputs may be fed back to prediction model 402 as input to train prediction model 402 (e.g., alone or in conjunction with user indications of the accuracy of the outputs, labels associated with the inputs, or with other reference feedback information). In some embodiments, prediction model 402 may update its configurations (e.g., weights, biases, or other parameters) based on its assessment of its prediction (e.g., outputs 406) and reference feedback information (e.g., user indication of accuracy, reference labels, or other information). In some embodiments, where prediction model 402 is a neural network, connection weights may be adjusted to reconcile differences between the neural network's prediction and the reference feedback. Some embodiments include one or more neurons (or nodes) of the neural network requiring that their respective errors be sent backward through the neural network to them to facilitate the update process (e.g., backpropagation of error). Updates to the connection weights may, for example, be reflective of the magnitude of the error propagated backward after a forward pass has been completed. In this way, for example, the prediction model 402 may be trained to generate better predictions.

In some embodiments, a set of labeled training data may be provided to prediction model 402. The labeled training data may include a set of activity log data obtained via telecommunication devices 104*a*-104*n* and/or activity log data associated with telecommunication devices 104*a*-104*n* via historical data database 132. Furthermore, the labeled training data may also include indications of whether one or more services of telecommunication devices 104*a*-104*n* were either disabled or enabled based on each respective candidate event detected in the activity log data. For example, a first telecommunication device 104*a* may have a first candidate event in its activity log data, and that particular candidate event later caused the disablement of one or more services while a second telecommunication device 104*b* may have a second candidate event in its activity log data, and the second candidate event was enabled (e.g., as opposed to disabled). The labeled training data may be fed as input into prediction model 402 to train the prediction model (e.g., updating one or more weights of a neural network) to make the prediction model more accurate. Additionally, this labeled training data may generate an output 406 that may be compared to the ground truth data (e.g., the labeled training data) to be provided as reference feedback to prediction model 402 to cause the prediction model to generate more accurate predictions. This process may be repeated with a whole set of training data (e.g., all activity log data of telecommunication devices 104*a*-104*n* and the associated data of whether or not one or more services were enabled/disabled) to improve the prediction model's accuracy.

In some embodiments, the output of prediction model 402 may be used as an input to a rules-based decision engine configured to determine whether a service of a telecommunication device should be disabled. The rules-based decision engine may take various criteria, such as the velocity with which the candidate event infects telecommunication devices, the sensitivity of the information being harvested from the software loaded to the telecommunication devices, prior candidate events detected by that telecommunication device, or other factors, when determining a subsequent action to be performed (i.e., whether a service is to be disabled). In some embodiments, the rules-based decision engine may use a weight combination of the various criteria to generate a decision, where each input may have a same or different weight. For example, the weight of prediction model 402 may be given higher weight than other factors in some cases based on an accuracy of prediction model 402.

In some embodiments, model subsystem 118 may be configured to generate training data from activity log data, candidate events, and indications of whether one or more services of telecommunication devices 104*a*-104*n* were disabled/enabled to train prediction model 402. For instance, model subsystem 118 may obtain activity log data from one or more telecommunication devices 104*a*-104*n* and/or historical data database 132 and determine a candidate event indicating malware is detected in the activity log data. If a candidate event indicating malware is detected in the activity log data, model subsystem 118 may determine via the activity log data one or more services that were enabled/disabled on the one or more telecommunication devices 104*a*-104*n* having the candidate event in their respective activity log data. Using this information, model subsystem 118 may generate training data to feed into the prediction model 402 to train the prediction model. Prediction model 402 may be trained to detect patterns of which candidate events indicating malware were actually malware or not. Based on detecting patterns of which candidate events are malware, model subsystem 118 may be used to generate predictions of whether or not to disable one or more services of telecommunication devices where a candidate event appears in the activity log data of telecommunication devices 104*a*-104*n*.

In some embodiments, model subsystem 118 may retrieve a model (e.g., a neural network or other machine learning model) from model database 134. Model database 134 may store one or more machine learning models that are pre-trained for detecting whether or not to disable services of telecommunication devices 104*a*-104*n* based on candidate events detected in their respective activity log data. In response to model subsystem 118 retrieving a pre-trained model from model database 134, model subsystem 118 may further train the pre-trained model based on the generated training data to generate more accurate predictions.

Example Flowcharts

Figure 5A:
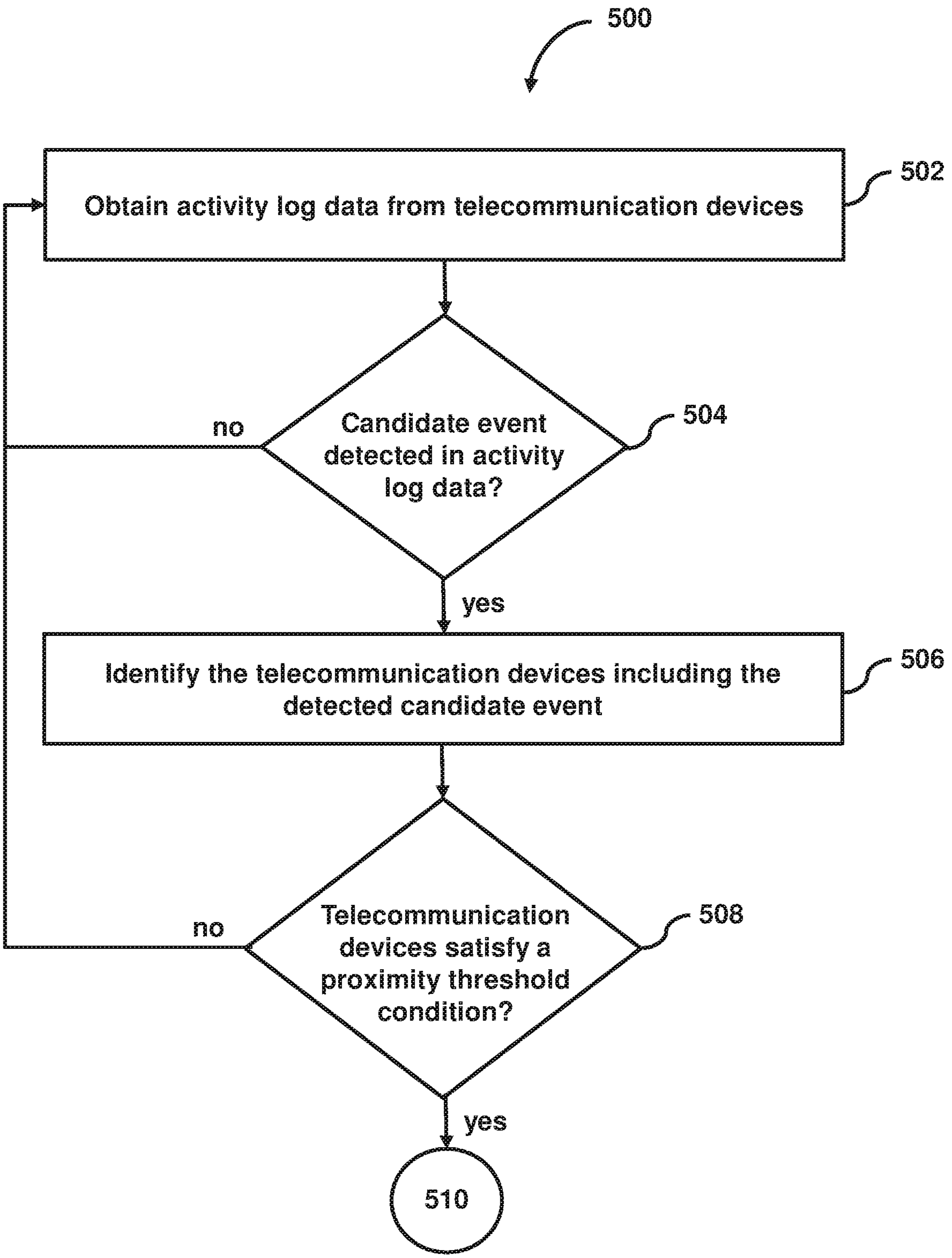
FIGS. 5A and 5B show a flowchart of a method for improving cybersecurity for telecommunication devices, in accordance with one or more embodiments.
Figure 5B:
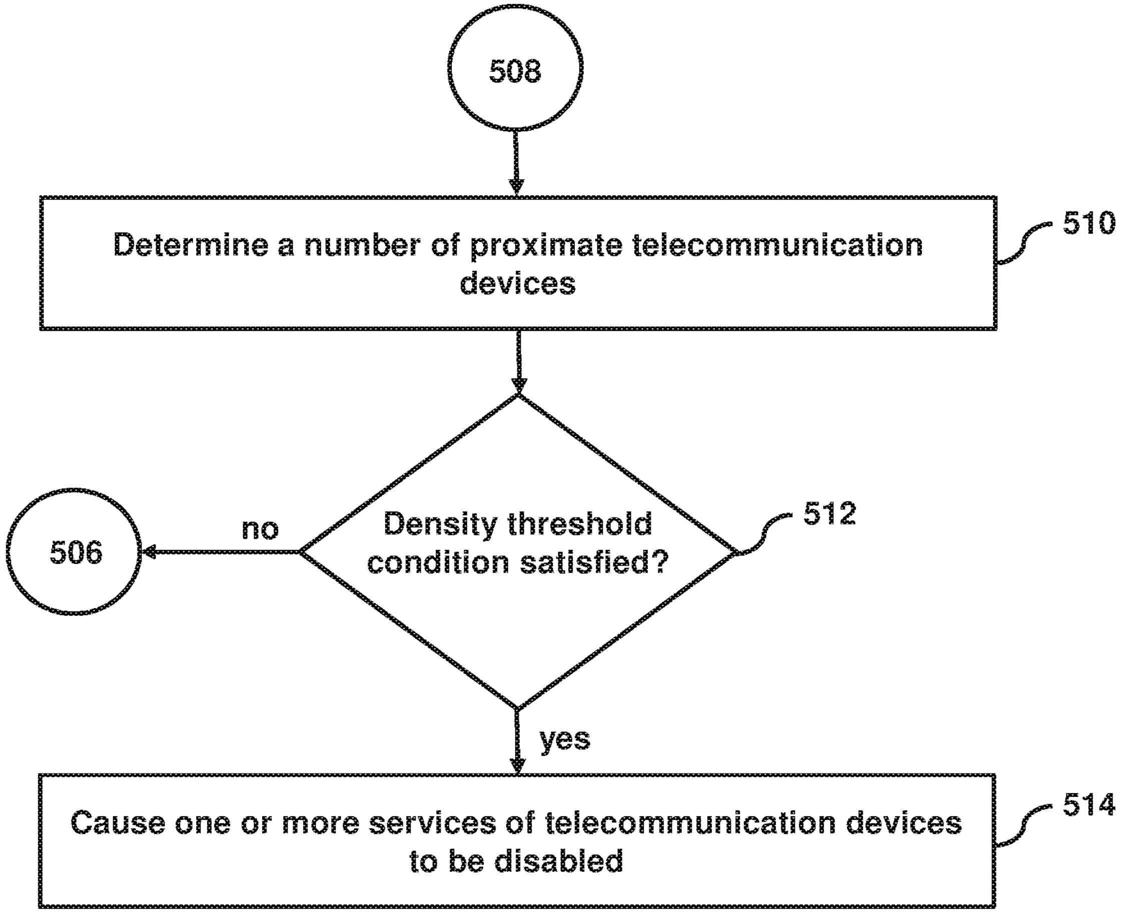

FIGS. 5A and 5B are example flowcharts of processing operations of methods that enable the various features and functionality of the system as described in detail above. The processing operations and the method presented below are intended to be illustrative and non-limiting. In some embodiments, for example, the method may be accomplished with one or more additional operations not described, and/or without one or more of the operations discussed. Additionally, the order in which the processing operations of the method is illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 5A shows a method 500 for an improved mechanism for improving cybersecurity for telecommunication devices. In operation 502, activity log data may be obtained from telecommunication devices. As an example, activity log data including activities associated with each of telecommunication devices 104, such as the loading of software thereto, may be retrieved from each telecommunication device 104, historical data database 132, or both. In some cases, telecommunication devices 104 may be located at the same or different geographic locations. The activity log data may also include information such as the name of the activity, the times/dates that an activity occurs, or other information. In some embodiments, operation 502 may be performed by a subsystem that is the same or similar to intrusion monitor subsystem 112.

In operation 504, a determination may be made as to whether a candidate event was detected in the activity log data. For example, the activity log data of a telecommunication device may be analyzed to determine whether any records in the activity log data represent a candidate event of the loading or attempted loading of software to the telecommunication device. In some embodiments, a classifier may be used to determine whether the activity log data includes any records representative of a candidate event (e.g., based on a similarity score between a string of characters associated with an action of the telecommunication device with a known malware loading action character string). If, at operation 504, it is determined that no candidate events were detected in the activity log data, method 500 may return to operation 502 to obtain updated activity log data from some or all of the telecommunication devices. If, however, at operation 504, a candidate event is detected in the activity log data, method 500 may proceed to operation 506. In some embodiments, operation 504 may be performed by a subsystem that is the same or similar to intrusion monitor subsystem 112.

In operation 506, telecommunication devices included the detected candidate event may be identified. As an example, one or more telecommunication devices located at different geographic locations may include a candidate event indicating malware. In some embodiments, a determination may be made as to whether a first telecommunication device's activity log data included a record of the candidate event and, if so, additional telecommunication devices' activity log data may be analyzed to determine if the candidate event was also detected therein. If so, then other telecommunication devices may also have their activity log data analyzed for the candidate event. These telecommunication devices may be identified via their location data, telecommunication device serial number, telecommunication device name, or other telecommunication device identifier information. Operation 506 may be performed by a subsystem that is the same or similar to intrusion monitor subsystem 112.

In operation 508, a determination is made as to whether the telecommunication devices with which the candidate event was detected satisfy a proximity threshold condition. The proximity threshold condition may be satisfied when the candidate event was detected within the activity log data of two (or more) telecommunication devices, and the telecommunication devices are within a threshold distance of one another. The telecommunication devices may be located at different geographic locations. Nefarious users that are physically (or remotely) loading (or attempting to load) harmful software (e.g. malware) onto telecommunication devices may target a geographic location. The proximity threshold condition may be satisfied if telecommunication devices are within a certain threshold distance of one another. If one or more of the telecommunication devices are determined to have satisfied such proximity threshold condition, method 500 may proceed to operation 510 as indicated in FIG. 5B. If one or more of the telecommunication devices do not satisfy a proximity threshold condition, method 500 may proceed back to operation 502 to continue monitoring the activity log data of the telecommunication devices in system 100. In some embodiments, if no telecommunication devices are determined to satisfy the proximity threshold condition, method 500 may end. In some embodiments, if one or more of the telecommunication devices are determined to not satisfy the proximity threshold condition, method 500 may return to operation 506 to determine whether any other telecommunication devices satisfy the proximity threshold condition. In this way, telecommunication device security may be improved by "double checking" the telecommunication devices including the candidate event in their respective activity log data and notifying the operations team to evaluate the candidate event. Additionally, in some cases, nefarious users may attempt to circumvent telecommunication device security systems by only uploading malware on telecommunication devices that are far from one another-thus not triggering the proximity threshold condition. Therefore, telecommunication device security may also be improved based on the notification of the operations team. Operation 508 may be performed by a subsystem that is the same or similar to proximity subsystem 114.

Referring to FIG. 5B, operation 510 may determine a number of proximate telecommunication devices. The number of proximate telecommunication devices may be determined based on a number of telecommunication devices that satisfy the proximity threshold condition. For example, the number of proximate telecommunications may correspond to devices determined to be proximate to a first telecommunication and which a candidate event indicating malware was also detected in their respective activity log data. The number of proximate telecommunication devices may be represented by a number, integer, percentage, or other metric. In some embodiments, operation 510 may be performed by a subsystem that is the same or similar to proximity subsystem 114.

In operation 512, a determination may be made as to whether the number of proximate telecommunication devices satisfy a density threshold condition. As an example, the number of telecommunication devices indicating a candidate event in their respective activity log data may be compared with other telecommunication devices that do not indicate the candidate event in the respective activity log data that are within a proximate distance of one another. If the number of telecommunication devices indicating the candidate event is greater than or equal to a threshold number, then those telecommunication devices may satisfy the density threshold condition. For instance, the density threshold condition may be satisfied if the number of proximate telecommunication devices is greater than or equal to a predetermined value, number, integer, ratio, or percentage of telecommunication devices (e.g., 75% or more, 85% or more, etc.). If, at operation 512, the density threshold condition is satisfied, method 500 may proceed to operation 514. If the density threshold condition is not satisfied, method 500 may return to operation 506 to further identify telecommunication devices including the candidate event indicating malware in their respective activity log data. Alternatively, if the density threshold condition is not satisfied, method 500 may return to operation 502 or method 500 may end. In some embodiments, operation 512 may be performed by a subsystem that is the same or similar to proximity subsystem 114.

In operation 514, one or more services of the telecommunication devices may be caused to be disabled. For example, in response to determining that one or more telecommunication devices satisfy the proximity threshold condition and the density threshold condition, one or more services of those telecommunication devices may be disabled. In some embodiments, the services may be disabled for a predetermined amount of time and may be enabled upon the predetermined amount of time elapsing or other conditions occurring. In some embodiments, operation 514 may be performed by a subsystem that is the same or similar to service subsystem 116.

In some embodiments, the various computers and subsystems illustrated in FIG. 1 may include one or more computing devices that are programmed to perform the functions described herein. The computing devices may include one or more electronic storages (e.g., database(s) 130, which may include historical data database(s) 132, model database(s) 134, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software, hardware, firmware, some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified (e.g., with explicit language like "after performing X, performing Y") in contrast to statements that might be improperly argued to imply sequence limitations, like "performing X on items, performing Y on the X'ed items," used for purposes of making claims more readable rather than specifying sequence. Statements referring to "at least Z of A B, and C," and the like "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method, comprising: disabling a first service of a first telecommunication device based on a candidate event being detected in activity log data of the first telecommunication device, a proximity threshold condition being satisfied, and a density threshold condition being satisfied, wherein the candidate event is indicative of malware being loaded on the first telecommunication device.

2. A method, comprising: obtaining activity log data from a plurality of telecommunication devices located at different geographic locations, wherein the activity log data comprises loading of software on a first telecommunication device of the plurality of telecommunication devices and loading of instances of the software on other telecommunication devices of the plurality of telecommunication devices; detecting, based on the software that was loaded on the first telecommunication device, a candidate event indicating malware loaded on the first telecommunication device; identifying a set of telecommunication devices for which the candidate event was detected in the activity log data; determining, based on a proximity threshold condition, a number of proximate telecommunication devices included in the set of telecommunication devices, each of the proximate telecommunication devices being a telecommunication device that satisfies the proximity threshold condition; determining whether the number of the proximate telecommunication devices satisfies an density threshold condition indicative of a malware installation attempt; and responsive to determining that the number of the proximate telecommunication devices satisfy the density threshold condition, causing a first service of the first telecommunication device to be disabled.

3. The method of embodiment 2, further comprising: causing a second service of each of the proximate telecommunication devices included in the set of telecommunication devices to be disabled, wherein the second service is the same or similar to the first service of the first telecommunication device.

4. The method of any one of embodiments 2-3, further comprising: responsive to determining that the number of proximate telecommunication devices fails to satisfy the density threshold condition, preventing the first service of the first telecommunication device from being disabled.

5. The method of any one of embodiments 2-4, further comprising: in response to the candidate event being detected for the first telecommunication device, adding the first service of the first telecommunication device to a candidate list of services to be disabled, wherein the first service of the first telecommunication device is removed from the candidate list of services to be disabled in response to the first service of the first telecommunication device being disabled.

6. The method of embodiment 2, wherein the density threshold condition being satisfied comprises the number of telecommunication devices being greater than or equal to a threshold number indicative of a malware installation attempt.

The method of embodiment 2, wherein the proximity threshold condition being satisfied comprises each telecommunication device of the set of telecommunication devices being within a threshold distance of a first geographic location of the first telecommunication device.

8. The method of any one of embodiments 2-7, further comprising: extracting, from the activity log data, a first timestamp indicating a time that the candidate event being detected for the first telecommunication device and a set of timestamps each indicating a respective time that the candidate event was detected for each telecommunication device included in the set of telecommunication devices, wherein the first service of the first telecommunication device is disabled based on a respective timestamp included in the set of timestamps associated with each of the proximate telecommunication devices included in the set of telecommunication devices satisfying a temporal threshold condition.

9. The method of embodiment 8, wherein the temporal threshold condition comprises determining, based on the first timestamp and the set of timestamps, that the respective time that the candidate event was detected for each telecommunication device included in the set of telecommunication devices occurred within a predetermined amount of time that the time that the candidate event was detected for the first telecommunication device.

10. The method of any one of embodiments 2-9, wherein the first service is disabled for a predefined period of time, further comprising: receiving an indication that the malware was not installed on the first telecommunication device; and responsive to determining that the predefined period of time elapsed, causing the first service of the first telecommunication device to be enabled.

11. The method of any one of embodiments 2-10, further comprising: generating training data comprising the loading of software on the other telecommunication devices of the plurality of telecommunication devices and an indication of whether one or more services of each of the other telecommunication devices were disabled in response; and causing a machine learning model to be trained to detect patterns in the loading of software, wherein responsive to detecting a future instance of the candidate event in additional activity log data of one or more telecommunication devices, the trained machine learning model is used to determine whether a service of the one or more telecommunication devices is to be disabled.

12. A tangible, non-transitory, machine-readable medium storing instructions that, when executed by one or more processors, effectuate operations comprising any one of embodiments 2-11.

13. A system comprising: memory storing instructions; and one or more processors configured to execute the instructions to effectuate operations comprising those of any of embodiments 2-11.

14. A system comprising means for performing any one of embodiments 2-11.

What is claimed is:

1. A system for preventing malware infections, comprising:
- memory storing computer program instructions; and
- one or more processors that execute the computer program instructions to cause the one or more processors to:
  - detect a candidate event indicating malware loaded on a first telecommunication device of a plurality of telecommunication devices;
  - identify, based on activity log data of the plurality of telecommunication devices, a set of telecommunication devices for which the candidate event was detected;
  - determine a number of proximate telecommunication devices included in the set of telecommunication devices that satisfy a proximity threshold condition;
  - determine that the number of proximate telecommunication devices satisfies a density threshold condition indicative of a malware installation attempt; and
  - responsive to determining that the number of proximate telecommunication devices satisfies the density threshold condition indicative of a malware installation attempt, cause a first service of the first telecommunication device to be disabled.

2. A method, implemented using one or more processors of a cybersecurity system, comprising:
- detecting a candidate event indicating malware loaded on a first telecommunication device of a plurality of telecommunication devices;
- identifying a set of telecommunication devices for which the candidate event was detected;
- determining a number of telecommunication devices included in the set of telecommunication devices that satisfy a proximity threshold condition;
- determining that the number of telecommunication devices satisfy a density threshold condition indicative of a malware installation attempt; and
- based on the proximity threshold condition and the density threshold condition being satisfied, causing a first service of the first telecommunication device to be suspended.

3. The method of claim 2, wherein detecting the candidate event comprises:
- detecting software that was loaded on the first telecommunication device.

4. The method of claim 2, further comprising:
- obtaining activity log data from the plurality of telecommunication devices, wherein the set of telecommunication devices are identified based on the activity log data.

5. The method of claim 4, wherein the activity log data comprises loading of software to the first telecommunication device and loading of instances of the software on other telecommunication devices of the plurality of telecommunication devices.

6. The method of claim 2, further comprising:
- causing, the proximity threshold condition and the density threshold condition being satisfied, a second service of each telecommunication device of the set of telecommunication devices to be suspended.

7. The method of claim 2, wherein causing the first service of the first telecommunication device to be suspended comprises:
- disabling, for at least a predefined amount of time, the first service of the first telecommunication device.

8. The method of claim 2, further comprising:
- prior to causing the first service of the first telecommunication device to be suspended, adding the first service of the first telecommunication device to a candidate list of services to be suspended based on the candidate event being detected.

9. The method of claim 8, further comprising:
- removing the first service of the first telecommunication device from the candidate list of services to be suspended based on the first service of the first telecommunication device being suspended.

10. The method of claim 2, wherein determining that the number of telecommunication devices that satisfy the density threshold condition comprises:

determining that the number of telecommunication devices is greater than or equal to a threshold number indicative of a malware installation attempt.

11. The method of claim 2, wherein determining the number of telecommunication devices that satisfy the proximity threshold condition comprises:

determining a distance of each telecommunication device of the plurality of telecommunication devices from the first telecommunication device; and determining that each telecommunication device included in the set of telecommunication devices is within a threshold distance of the first telecommunication device.

12. The method of claim 2, further comprising:

obtaining activity log data from the plurality of telecommunication devices; and extracting, from the activity log data, timestamps indicating a respective time that the candidate event was detected for each telecommunication device included in the set of telecommunication devices, wherein the first service of the first telecommunication device is suspended based on the timestamps associated satisfying a temporal threshold condition.

13. The method of claim 12, wherein the temporal threshold condition being satisfied comprises:

determining, based on the timestamps, that the candidate event was detected for each telecommunication device included in the set of telecommunication devices within a predetermined amount of time that the candidate event was detected for the first telecommunication device.

14. The method of claim 2, further comprising:

causing the first service of the first telecommunication device to be un-suspended based on a predefined amount of time elapsing.

15. The method of claim 2, further comprising:

generating training data comprising instances of software being loaded on one or more of the plurality of telecommunication devices and an indication of one or more services of each of the one or more of the plurality of telecommunication devices being suspended in response.

16. The method of claim 15, further comprising:

training, using the training data, a machine learning model to detect patterns during the software being loaded.

17. One or more non-transitory computer-readable media storing computer program instructions that, when executed by one or more processors, effectuate operations comprising:

identifying a set of telecommunication devices that detected an attempt to load software thereon;

determining, based on a number of telecommunication devices included in the set of telecommunication devices, that one or more conditions indicative of a malware installation attempt have been satisfied, wherein the one or more conditions comprise at least one of a proximity threshold condition and a density threshold condition; and based on determining that the one or more conditions have been satisfied, causing at least a first service of at least some of the set of telecommunication devices to be suspended.

18. The one or more non-transitory computer-readable media of claim 17, wherein determining that the one or more conditions have been satisfied comprises:

determining, based on a proximity of the set of telecommunication devices to one another, that the proximity threshold condition has been satisfied; and determining, based on the number of telecommunication devices included in the set of telecommunication devices, that the density threshold condition has been satisfied.

19. The one or more non-transitory computer-readable media of claim 17, wherein the operations further comprise:

detecting a candidate event comprising an attempt to load the software to a first telecommunication device of the set of telecommunication devices, wherein the set of telecommunication devices comprises one or more other telecommunication devices for which the candidate event was also detected.

20. The one or more non-transitory computer-readable media of claim 17, wherein the operations further comprise:

generating training data comprising instances of software being loaded on a plurality of telecommunication devices and an indication of one or more services of each of the plurality of telecommunication devices being suspended in response; and training, using the training data, a machine learning model to detect patterns in the software being loaded.

* * * * *